(12) United States Patent
Clement et al.

(10) Patent No.: US 10,139,993 B2
(45) Date of Patent: Nov. 27, 2018

(54) ENHANCED WINDOW CONTROL FLOWS (71) Applicant: Google LLC, Mountain View, CA (US)

(72) Inventors: Manuel Christian Clement, Felton, CA (US); Alexander Friedrich Kuscher, San Francisco, CA (US)

(73) Assignee: Google LLC, Mountain View, CA (US)

(*) Notice: Subject to any disclaimer, the term of this patent is extended or adjusted under 35 U.S.C. 154(b) by 185 days.

(21) Appl. No.: 14/161,094

(22) Filed: Jan. 22, 2014

(65) Prior Publication Data

US 2015/0205448 A1 Jul. 23, 2015

(51) Int. Cl.
G06F 3/0484 (2013.01)
G06F 3/0482 (2013.01)
G06F 3/0488 (2013.01)
G06F 3/0481 (2013.01)
G06F 9/451 (2018.01)

(52) U.S. Cl.
CPC .......... G06F 3/0484 (2013.01); G06F 3/0481 (2013.01); G06F 3/0482 (2013.01); G06F 3/0488 (2013.01); G06F 9/451 (2018.02)

(58) Field of Classification Search
CPC ........ G06F 9/44; G06F 3/0482; G06F 3/0484; G06F 3/048
USPC .......................................................... 715/798
See application file for complete search history.

(56) References Cited

U.S. PATENT DOCUMENTS

| | | |
|---|---|---|
| D418,497 S | 1/2000 | Howard, III et al. |
| 6,236,398 B1 * | 5/2001 | Kojima ................ G06F 3/0362 345/419 |
| D453,166 S | 1/2002 | Ording |
| D526,328 S | 8/2006 | Reece et al. |
| D539,810 S | 4/2007 | Cummins |
| D544,880 S | 6/2007 | Harvey et al. |
| D547,322 S | 7/2007 | Ivanov |

(Continued)

FOREIGN PATENT DOCUMENTS

| | | |
|---|---|---|
| CN | 101932993 A | 12/2010 |
| CN | 102440065 A | 5/2012 |

(Continued)

OTHER PUBLICATIONS

International Search Report and Written Opinion for Application No. PCT/US2015/012432 dated Apr. 10, 2015.

(Continued)

Primary Examiner — Angie M Badawi
(74) Attorney, Agent, or Firm — Lerner, David, Littenberg, Krumholz & Mentlik, LLP (57) ABSTRACT Aspects of the disclosure relate generally to morphing window controls associated with a window on a display of a client computing device. In order to do so, a plurality of window controls may be presented. Each window control is configured to perform an original function to control the window. The computing device is configured to receive a first input associated with a first one of the plurality of window controls. The first input may provide for initiating a function associated with the first window control. In response to the received first input, the original function associated with another window control is converted to an alternate function. The alternate function of the other window control is configured to perform a different task to control the window than the original function of the other window control.

26 Claims, 11 Drawing Sheets

(56) References Cited

U.S. PATENT DOCUMENTS

| | | | |
|---|---|---|---|
| D572,719 S | 7/2008 | Beamish et al. | |
| D581,425 S | 11/2008 | Jasinski | |
| D582,932 S | 12/2008 | Blankenship et al. | |
| 7,509,348 B2 | 3/2009 | Burtner et al. | |
| D601,158 S | 9/2009 | Rezende | |
| D615,546 S | 5/2010 | Lundy et al. | |
| D631,060 S | 1/2011 | Flik et al. | |
| D637,605 S | 5/2011 | Brinda | |
| D658,200 S | 4/2012 | Gleasman et al. | |
| D659,706 S | 5/2012 | David et al. | |
| D663,313 S | 7/2012 | David et al. | |
| D677,682 S | 3/2013 | Kaufthal et al. | |
| D684,160 S | 6/2013 | Truelove et al. | |
| D684,182 S | 6/2013 | Phelan | |
| D691,171 S | 10/2013 | Brinda et al. | |
| D691,629 S | 10/2013 | Matas et al. | |
| D696,680 S | 12/2013 | Bae et al. | |
| D701,872 S | 4/2014 | Liu et al. | |
| D705,238 S | 5/2014 | Thompson et al. | |
| D705,239 S | 5/2014 | Thompson et al. | |
| D707,698 S | 6/2014 | Talbot | |
| D710,878 S | 8/2014 | Jung | |
| D711,413 S | 8/2014 | Yu et al. | |
| D722,323 S | 2/2015 | Pai et al. | |
| D723,059 S | 2/2015 | Shiplacoff et al. | |
| D735,747 S | 8/2015 | McCormack et al. | |
| D738,887 S | 9/2015 | Ma et al. | |
| D738,895 S | 9/2015 | Myoung et al. | |
| D739,433 S | 9/2015 | Kim et al. | |
| D741,877 S | 10/2015 | Torres et al. | |
| D751,598 S | 3/2016 | Xu et al. | |
| D751,599 S | 3/2016 | Connolly | |
| D752,061 S | 3/2016 | Ahn et al. | |
| D753,132 S | 4/2016 | Cuthbert et al. | |
| D754,183 S | 4/2016 | Liu et al. | |
| D755,802 S | 5/2016 | Kim | |
| D758,422 S | 6/2016 | Zhao | |
| D759,705 S | 6/2016 | Arroyo et al. | |
| D768,653 S | 10/2016 | Moroney et al. | |
| D774,530 S | 12/2016 | Clement et al. | |
| D776,694 S | 1/2017 | Kim et al. | |
| D784,403 S | 4/2017 | Jones-McFadden et al. | |
| D784,408 S | 4/2017 | Mustonen | |
| D792,903 S | 7/2017 | Park et al. | |
| D795,284 S | 8/2017 | Miller et al. | |
| D795,291 S | 8/2017 | Gottlieb | |
| D797,138 S | 9/2017 | Reiter et al. | |
| 2005/0091609 A1* | 4/2005 | Matthews | G06F 3/0482 715/804 |
| 2006/0075348 A1* | 4/2006 | Xu | G06F 3/0481 715/730 |
| 2006/0205469 A1* | 9/2006 | Schultz | G07F 17/32 463/16 |
| 2008/0059913 A1* | 3/2008 | Burtner | G06F 3/0482 715/854 |
| 2008/0218534 A1 | 9/2008 | Kim et al. | |
| 2009/0199128 A1 | 8/2009 | Matthews et al. | |
| 2009/0313584 A1* | 12/2009 | Kerr | G06F 3/012 715/849 |
| 2010/0146459 A1 | 6/2010 | Repka | |
| 2010/0180233 A1* | 7/2010 | Kruzeniski | G06F 3/0482 715/834 |
| 2012/0144330 A1 | 6/2012 | Flint | |
| 2012/0212420 A1 | 8/2012 | Shin | |
| 2013/0104075 A1 | 4/2013 | Matthews et al. | |
| 2013/0185672 A1 | 7/2013 | McCormick et al. | |
| 2013/0268837 A1 | 10/2013 | Braithwaite et al. | |
| 2013/0293589 A1 | 11/2013 | Hwang | |
| 2013/0332865 A1 | 12/2013 | Danton et al. | |
| 2014/0249926 A1* | 9/2014 | Wallace | G06Q 30/0277 705/14.64 |
| 2014/0274382 A1* | 9/2014 | Green | A63F 13/12 463/31 |
| 2015/0186017 A1 | 7/2015 | Lee | |
| 2015/0205448 A1 | 7/2015 | Clement et al. | |

FOREIGN PATENT DOCUMENTS

| | | |
|---|---|---|
| CN | 103034406 A | 4/2013 |
| CN | 103092601 A | 5/2013 |
| JP | 2006338173 A | 12/2006 |
| KR | 2008-0082761 A | 9/2008 |
| KR | 2010-0121470 A | 11/2010 |

OTHER PUBLICATIONS

Examiner's Report for Canadian Patent Application No. 2932823, dated Jan. 30, 2017. 4 pages.

Notice to File a Response for Korean Patent Application No. 10-2016-7022778, dated Sep. 14, 2017.

Partial European Search Report for European Patent Application No. 15740571.3 dated Sep. 15, 2017. 12 pages.

Schnell, Joshua, Microsofts 3D transparent interface, Mar. 2, 2012, pcworld.com [online], [site visited Sep. 25, 2017]. Available from Internet: https://www.pcworld.com/article/251202/microsofts_3d_transparent_interface_makes_us_feel_like_were_living_in_the_future.html (Year: 2012).

TheAnnihilator, Dynamic Blurred Background on UI, Aug. 2, 2015, unity.com [online], [site visited Sep. 12, 2017]. Available from Internet: https://forum.unity.com/threads/solved-dynamic-blurred-background-on-ui.345083/ (Year: 2015).

Examiner's Report for Canadian Patent Application No. 2,932,823 dated Dec. 28, 2017. 3 pages.

Extended European Search Report for European Patent Application No. 15740571.3 dated Jan. 4, 2018. 10 pages.

Examination Report No. 2 for Australian Patent Application No. 2015209319, dated Jan. 19, 2017.

Notice of Acceptance for Australian Patent Application No. 2015209319, dated Apr. 4, 2017. 3 pages.

First Office Action for Chinese Patent Application No. 201580003599.7, dated Aug. 1, 2018.

Notice of Allowance for Korean Patent Application No. 10-2016-7022778, dated Apr. 27, 2018.

* cited by examiner

ENHANCED WINDOW CONTROL FLOWS

BACKGROUND

Computer systems employ Graphical User Interface (GUI) windows as a way to present information to a user on a display device. For example, a window may include an internet browser window or an application window, such as for productivity (e.g. documents and word processing windows) or games. Such windows employ window controls so that a user may manipulate the window, for instance controls to minimize, maximize, or close the window.

SUMMARY

Aspects of the disclosure provide a computer implemented system and method to morph window controls. The method includes providing, using one or more processors, a plurality of window controls associated with a window of a computer interface, each window control of the plurality of window controls being configured to perform an original function, the original function being associated with a task to control the window; receiving a first input associated with a first one of the plurality of window controls; and in response to the received first input, converting, by the one or more processors, the original function associated with another one of the plurality of window controls to an alternate function, wherein the alternate function performs a different task than the original function for the other window control.

In one example, the method may also include in response to the received first input, converting an original graphic associated with the original function of the other window control to an alternate graphic associated with the alternate function of the other window control. In this example, converting the original graphic to an alternate graphic includes implementing an animation depicting the original graphic morphing into the alternate graphic. As another example, receiving an indication that an indicator is positioned at the other window control, the indicator identifying a point of focus on the computer interface; and displaying, in response to the received indication, a preview of the alternate function associated with the other window control. In this example, the preview includes showing a docking of the window, wherein the docking of the window positions the window so that an edge of the window touches an edge of the computer interface area. As another example, the method may include receiving a second input; in response to the received second input: initiating the alternate function associated with the other window control, and positioning the window in a different location on the computer interface. In this example, positioning the window includes docking the window so that an edge of the window touches an edge of the computer interface area. As another example, the method includes receiving a cancelling input, based on the cancelling input, reverting the alternate function associated with the other window control back to the original function. In another example, the first input is received from at least one of a mouse, a keyboard, or a touch-screen display. In another example, the method may include receiving an indication that an indicator is positioned adjacent to the other window control, the indicator identifying a point of focus on the computer interface; and based on the indication, displaying a symbol that identifies the other window control. In this example, the method may also include receiving a second input; and in response to the received second input: initiating one of the alternate functions associated with the other window control, and performing an animation with the symbol that signifies the other control has initiated its associated function. In this example, the animation includes bursting a shape, the shape of which is the symbol that identifies the other window control. Even further to this example, bursting the shape may include increasing the shape's size by a predetermined amount followed by exploding the shape.

Another aspect of the disclosure provides a system to morph window controls comprising one or more processors. These one or more processors are configured provide a plurality of window controls associated with a window of a computer interface, each window control of the plurality of window controls being configured to perform an original function, the original function being associated with a task to control the window, each original function having an original graphic associated therewith; receive a first input associated with a first one of the plurality of window controls; and in response to the received first input, convert the original graphic associated with another one of the plurality of window controls to an alternate graphic. In one example, the one or more processors are also configured to, in response to the received first input, convert the original function associated with the other window control to an alternate function, wherein the alternate function performs a different task than the original function for the other window control. In this example, conversion of the original graphic to an alternate graphic includes implementing an animation depicting the original graphic associated with the other window control morphing into the alternate graphic. As another example, the one or more processors are further configured to receive an indication that an indicator is positioned at the other window control, the indicator identifying a point of focus on the computer interface; and display, in response to the received indication, a preview of the alternate function associated with the other window control. In this example, the preview includes showing a docking of the window, of which the docking of the window positions the window so that an edge of the window is disposed along an edge of the computer interface area. As another example, the one or more processors are also configured to: receive a second input; in response to the received second input, the one or more processors: initiate the alternate function associated with the other window control, and position the window in a different location on the computer interface. As another example, the one or more processors are also configured to receive a cancelling input, in which in response to the cancelling input the one or more processors cause the alternate function associated with the other window control to revert back to the original function. As another example, the first input is received from at least one of a mouse, keyboard, or touch-screen display. In another example, the one or more processors are also configured to: receive an indication that an indicator is positioned within a predetermined area of the other window control, the indicator identifying a point of focus on the computer interface; and based on the indication, display a symbol that identifies the other window control. In this example, the one or more processors are also configured to: receive a second input; and in response to the received second input, the one or more processors: initiate an alternate functions associated with the other window control, and perform an animation with the symbol that signifies the other control has initiated the alternate function. In this example, the animation includes bursting a shape, wherein the shape is the symbol that identifies the other window control. Further to this example, bursting the shape includes increasing the shape's size by a predetermined amount followed by exploding the shape.

Aspects of the disclosure also provide for a non-transitory computer-readable storage medium, comprising instructions that, when executed by one or more processors, cause the one or more processors to perform a method. The method may include providing a plurality of window controls associated with a window of a computer interface, each window control of the plurality of window controls being configured to perform an original function, the original function being associated with a task to control the window; receiving a first input associated with a first one of the plurality of window controls; and in response to the received first input, converting, by the one or more processors, the original function associated with another one of the plurality of window controls to an alternate function, wherein the alternate function performs a different task than the original function for the other window control.

DETAILED DESCRIPTION

Aspects of the technology discussed herein relate generally to the morphing of window controls into a second set of window controls. For instance, the morphing of window controls may involve an animation change from the minimize/maximize/close icons to docking controls (e.g., a left arrow and a right arrow flanking a center maximization icon). In one scenario, the animation involves a smooth morphing of the minimize icon to the left arrow and a smooth morphing of the close icon to the right arrow. The docking icons may appear after a held click (of at least a second, for example) on the maximize control. The user can continue to hold the click and mouse over to either the left or right arrows to reveal a ghosted preview image of the window's location when docked. The user can activate the docking by releasing the click with the mouse over the desired arrow. Further, the user can cancel the docking by returning to the center reduce button (or elsewhere off of the arrows) and release. Upon either activating or canceling the docking, the docking icons will return to the standard window control icons. When canceled, this will happen by morphing in reverse.

According to another aspect, a "bubble burst" animation may be used to indicate a held click, and to signal the position of the cursor while the docking controls are active. For instance, a bubble figure (e.g., a partially or fully transparent gray circle or other indicator) will grow outward from the center of the cursor arrow after the required time for a held click to activate the docking controls. The bubble is arranged to follow the position of the cursor through the movements described above and can indicate to the user when the cursor is positioned to implement a docking snap of the window. In one scenario, when the user releases the held click (in either the docking activation or canceling positions), the bubble figure "bursts" by growing slightly larger before quickly disappearing. This coincides with a return to the non-docking controls and that the held click has been released.

In one example of the morphing function, a user may move a cursor to the maximize control of a window, the maximize control being one control from the window controls (e.g., minimize, maximize, and close). The user can then hold a click over the maximize control to initiate the docking feature. After holding the click, a transparent bubble shaped figure will appear over the maximize control. In one scenario, the minimize control morphs into a left arrow control and the close control morphs into a right arrow control. The morphing into the left and right arrow controls may be arranged to occur pictorially and functionally, meaning the image on the controls turn into left and right arrows, and their functions change as well.

After the second set of window controls are activated, the user may move the held click cursor from the maximize window control to, for example, the left arrow control. By doing so, the bubble indicator appears over the left arrow control and disappears from the maximize control. The moving bubble serves as an indicator that the cursor is currently positioned over the left arrow control. In addition, a ghosted preview image of the docked window will appear on the left side of a display area of the display screen while the cursor is on the left arrow control.

In this example, by releasing the held click cursor over the left arrow control, the particular window docks itself on the left side of the display. The window may dock itself in accordance with the ghost preview image.

Alternatively, if the user elects not to dock the window according to the left arrow control, the user may release the held click cursor over the maximize control. By doing so, this will cancel the docking feature and revert the left and right arrow controls back to the respective minimize and close window controls.

When the held click cursor is released for the purposes of docking the window or cancelling the docking function, the bubble figure disappears. For example, when the held click is released, the bubble figure grows slightly larger until it bursts, therefore disappearing.

Figure 1:
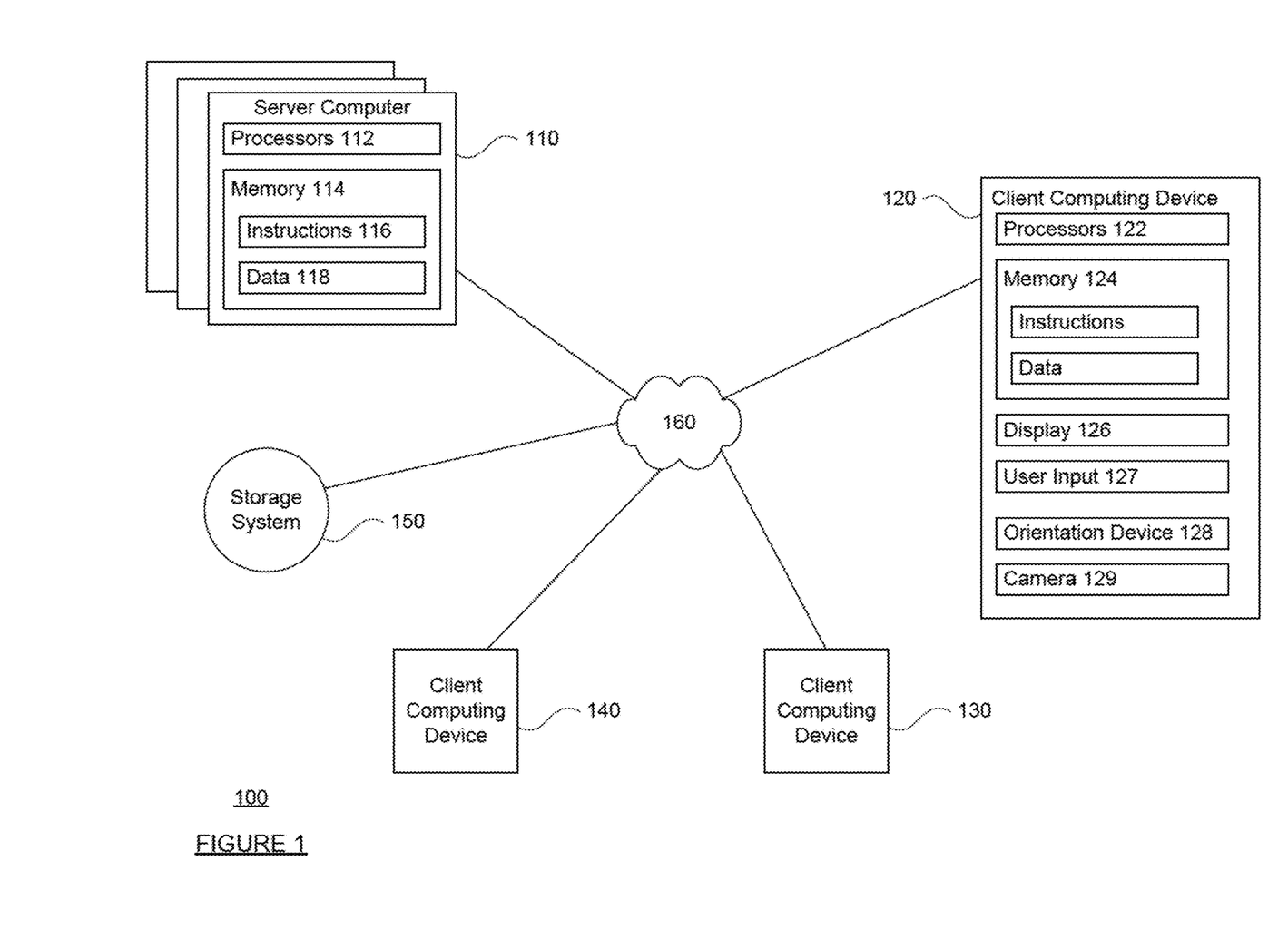
FIG. 1 is a functional diagram of an example system in accordance with aspects of the disclosure.
Figure 2:
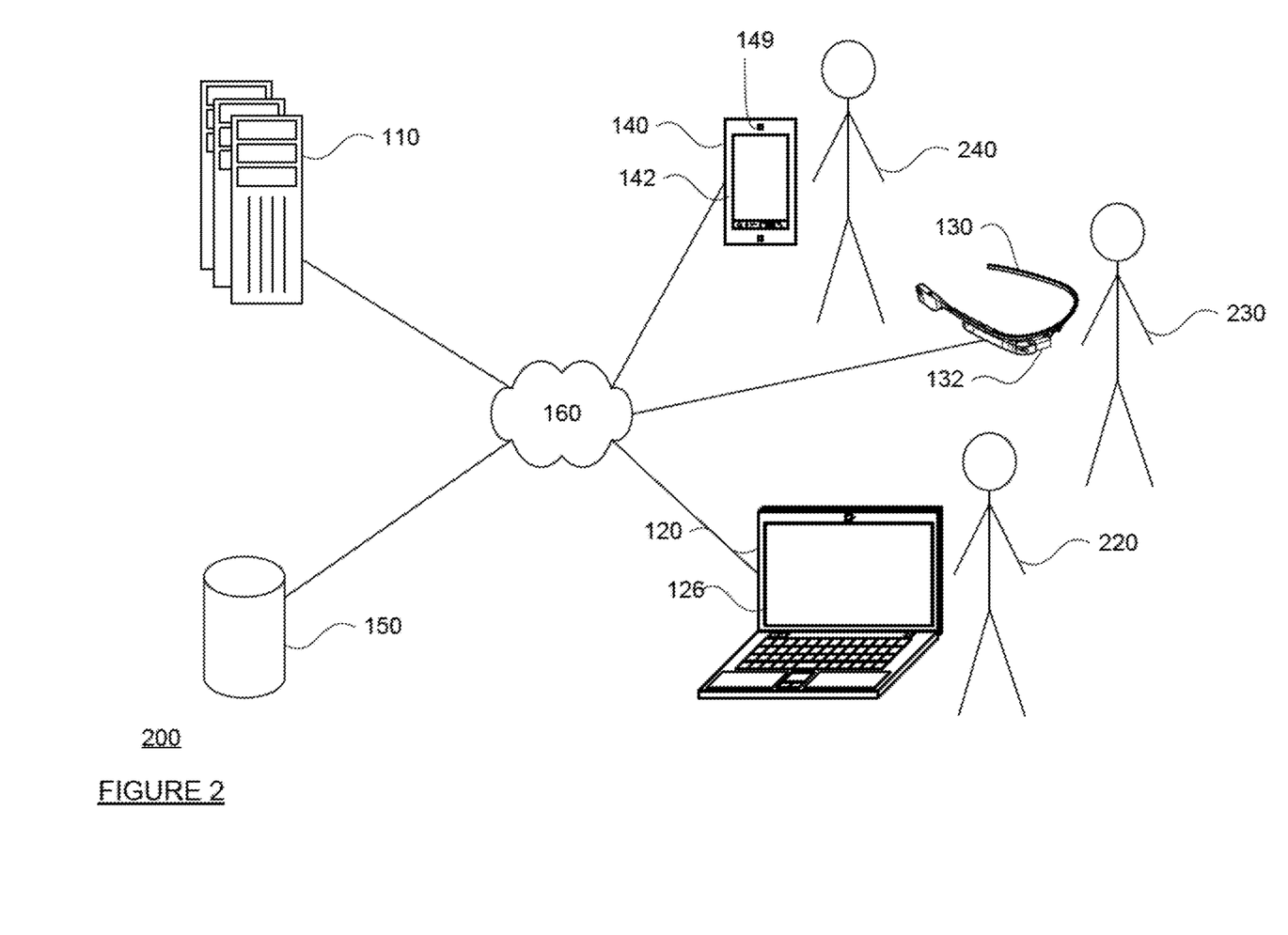
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each of the computing devices 110, 120, 130, and 140 can contain one or more processors 112, memory 114 and other components typically present in general purpose computing devices. Memory 114 of the computing devices can store information accessible by one or more processors 112, including instructions 116 that can be executed by the one or more processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processor, such as a commercially available CPU. Alternatively, the processor can be a dedicated component such as an ASIC or other hardware-based processor. Although not necessary, one or more of computing devices 110 may include specialized hardware components to perform specific computing processes, such as decoding video, matching image frames with images, distorting videos, encoding distorted videos, etc. faster or more efficiently.

Although FIG. 1 functionally illustrates the one or more processors, memory, and other elements of the computing devices 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing device 110. Accordingly, references to a processor, computer, computing device, or memory will be understood to include references to a collection of processors, computers, computing devices, or memories that may or may not operate in parallel. For example, the computing device 110 may include a single server computing device or a load-balanced server farm. And although some functions described below are indicated as taking place on a single computing device having a single processor, various aspects of the subject matter described herein can be implemented by a plurality of computing devices, for example, communicating information over a network 160.

The computing devices 110 can be at nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, one or more computing devices 110 may include a web server that is capable of communicating with storage system 150 as well as computing devices 120, 130, and 140 via the network. For example, one or more of server computing devices 110 may use network 160 to transmit and present information to a user, such as user 220, 230, or 240, on a display, such as displays 126, 132, or 142 of computing devices 120, 130, or 140. In this regard, computing devices 120, 130, and 140 may be considered client computing devices and may perform all or some of the features described herein.

Each of the client computing devices may be configured similarly to the server computing devices 110, with a processor, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 126, 132, or 142 (e.g., a monitor having a screen, a touch-screen, a projector, a television, or other device that is operable to display information), and user input device 127 (e.g., a mouse, keyboard, touch-screen or other haptic input, or a microphone). The displays on the client devices 120, 130 and 140 may display windows including browsers and applications typically displayed on such devices. The windows of which may contain the typical minimize, maximize, and close window controls. In addition, the displays may show a cursor from a mouse, or other indications similar to the cursor that indicates the user's point of focus on the display. For example, on a touch-screen display the user may touch the screen using their finger, stylus, etc., thereby indicating the user's point of focus on the display. The cursor (e.g., point of focus) information may be processed by processor(s) 122.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by one or more of server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected or incorporated into any of the computing devices 110-140 (not shown).

Although FIG. 1 functionally illustrates the processors, memory, and other elements of computing device 160 as being within the same block, the processors, computer, computing device, or memory can actually comprise multiple processors, computers, computing devices, or memories that may or may not be stored within the same physical housing. For example, the memory can be a hard drive or other storage media located in a housing different from that of computing devices 160. Accordingly, references to a processor, computer, computing device, or memory will be understood to include references to a collection of processors, computers, computing devices, or memories that may or may not operate in parallel. For example, the data server computer 160 may include server computing devices operating as a load-balanced server farm. And although some functions described below are indicated as taking place on a single computing device having a single processor, various aspects of the subject matter described herein can be implemented by a plurality of computing devices, for example, communicating information over network 160.

In this regard, the servers 110 and client devices 130, 140, and 150 can be at various nodes of a network 160 and capable of directly and indirectly communicating with other nodes of network 160. Although only a few computing devices are depicted in FIG. 1, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 3:
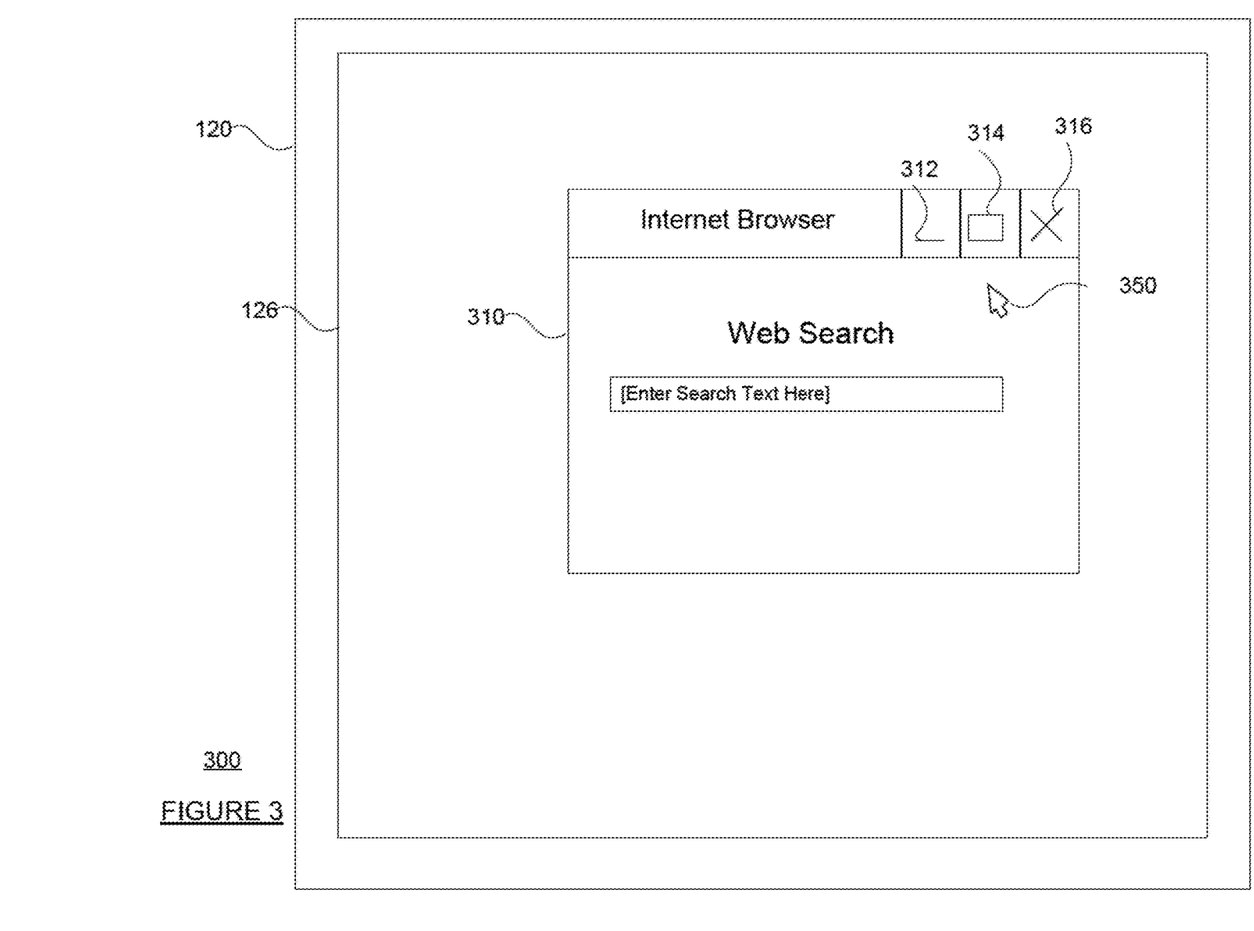
FIG. 3 illustrates a GUI window on a display in accordance with aspects of the disclosure.

As discussed above, a computing device may employ a GUI using windows to display information. The windows may include a browsing window, application window, and the like. FIG. 3 is an example 300 of display 126 of computing device 120 showing window 310 of a search engine using an Internet browser. As another example, the window may be an application window, such as a window displaying a game, such as solitaire.

A user may wish to "dock" the window on the display of the computing device. Docking the window on the computing device may include moving the window near one of the ends of the display area. For example, a user may wish to dock a window that is in the center of the screen to the left edge of the display. Alternatively, the user may wish to dock the window on the right side, top, or bottom of the display.

According to one aspect, to begin the docking function, the user moves a cursor or other indicator over a particular window control and then holds a click or other selection over that control. The held-click may be performed by any method in which a typical click is performed on a computing device. Referring back to example 200 of FIG. 2, a held-click on the touch-screen display 142 of computing device 140 may include holding a finger over the desired window control. In another example 200 of FIG. 2, computing device 120 may include a mouse (not shown) as an input device. In this regard, a user uses the mouse to position the cursor over the desired window control and then holds a click.

Figure 4:
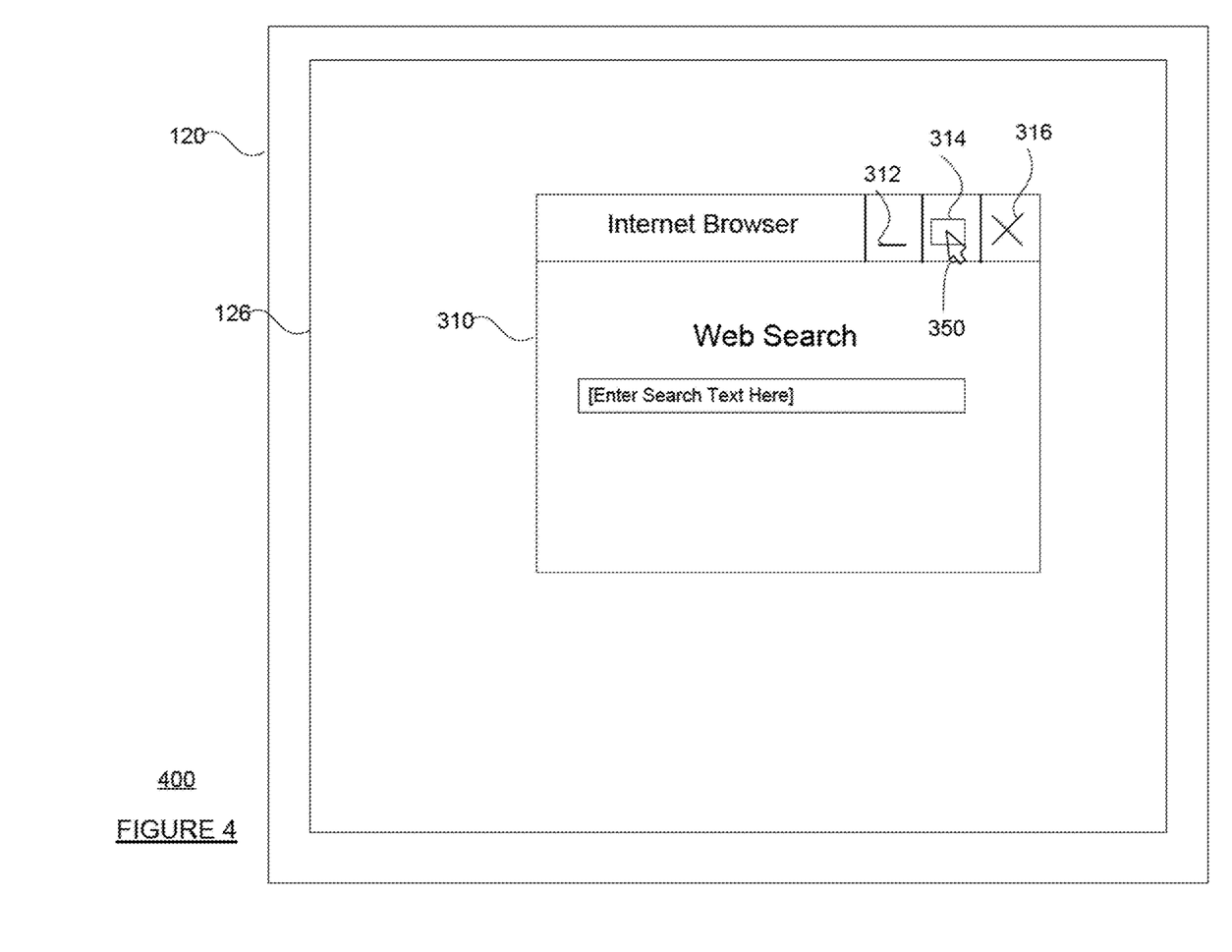
FIG. 4 illustrates the window of FIG. 3 with a cursor positioned over the maximize control in accordance with aspects of the disclosure.

Activating the morphing function with a held-click may be performed on any window control associated with the window. For instance, example 400 of FIG. 4 shows cursor 350 positioned over the maximize control 314 of window 310. Maintaining cursor 350's position over the maximize control 314, the user may hold a click on maximize control 314 to activate the morphing window control function. The held-click may be for a predetermined amount of time, such as 1 second, 0.5 seconds, 3 seconds, etc. As another example, to activate the morphing function, cursor 350 may be positioned over minimize control 312 of window 310 and then the click is held over that control for a predetermined amount of time. Initiating the morphing function may also be performed by positioning the cursor and holding a click over any window control associated with a window. As an alternative, any indicator other than a cursor may be used to activate the morphing function, such as a user's finger or stylus pen on a touch screen display. In this scenario, a held touch using the finger or stylus may activate the morphing function.

Figure 5:
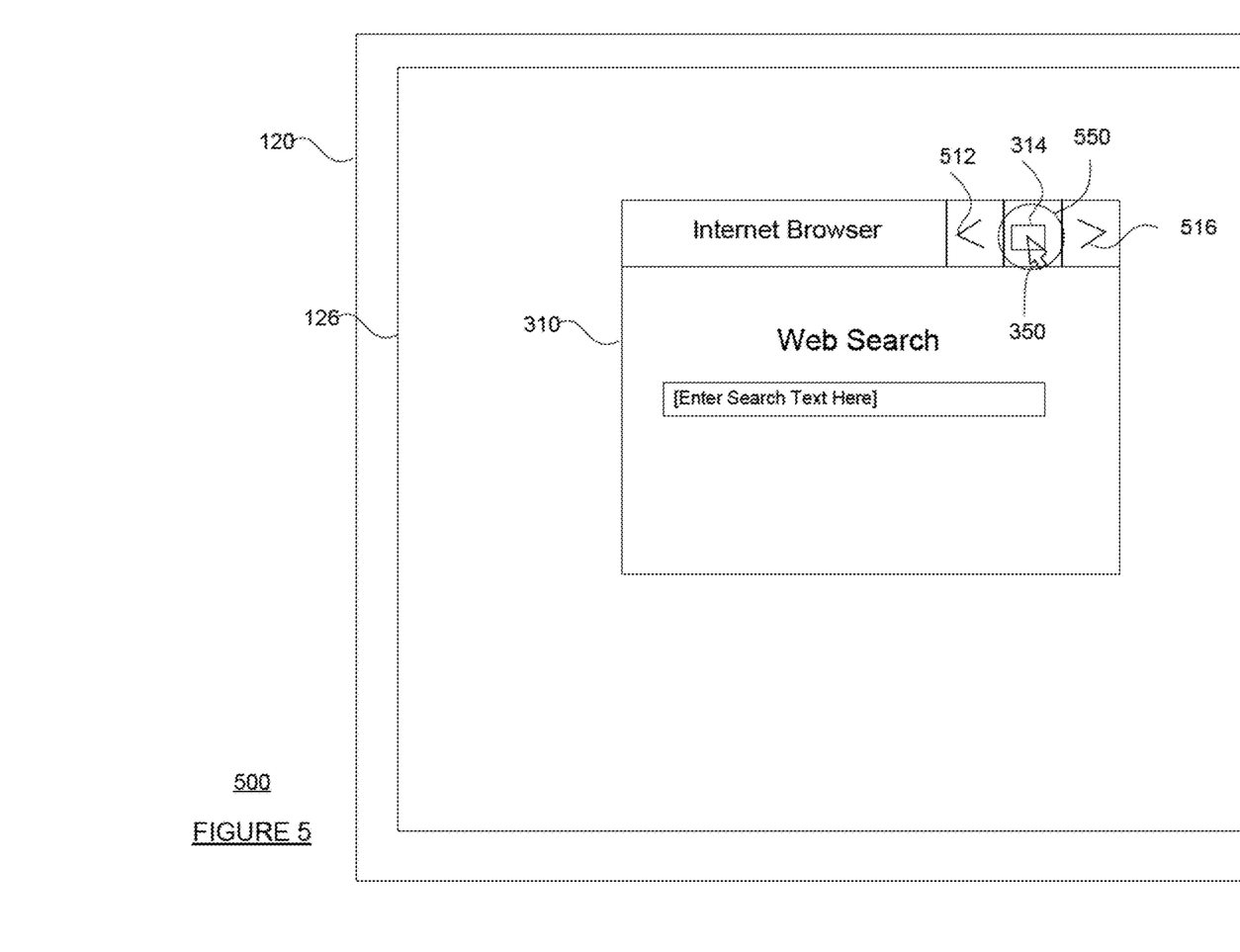
FIG. 5 illustrates a held click cursor in accordance with aspects of the disclosure.

After or contemporaneous with the click being held, a fluid morphing of the graphics associated with the window controls occurs. FIG. 5 illustrates an example 500 of the graphic associated with minimize control 312 (as shown in FIG. 4) changing into a left arrow (as shown in FIG. 5). In addition, the graphic associated with close control 316 (as shown in FIG. 4) changes into a right arrow (as shown in FIG. 5). This morphing of the graphic may include an animation that depicts the fluid morphing of the minimize control graphic to the left arrow graphic. In another example, any original graphic associated with a window control may morph into an alternate graphic, whether an animation is implemented or not.

In addition to the fluid morphing of the graphics of the window controls, a functional change of the window controls occurs with the morphing as well. Referring back to FIG. 5, minimize control 312 (as shown in FIG. 4) morphs into left arrow control 512 (as shown in FIG. 5) and close control 316 (as shown in FIG. 4) morphs into right arrow control 516 (as shown in FIG. 5). Prior to the activation of the morphing process, clicking on minimize control 312 may have reduced a window (such as a browser) to a task bar so the window is no longer displayed on the user's device. Once the morphing process is initiated, the function of the minimize control is changed along with the graphic changing into a left arrow. For instance in this scenario, the left arrow function, which will be discussed more below, now functions as a docking mechanism to dock the particular window on the left side of the display. In addition, clicking on close control 316 may have closed the particular window (such as a window displaying a game). Once morphing has been activated, the function of the close control is changed along with its graphic changing into a right arrow. In this regard, the right arrow function, which will also be discussed more below, now functions as a docking mechanism to dock the particular window on the right side of the display.

As an alternative, the window controls may change by a user selecting a shortcut. For instance, there may be a shortcut button on the user's keyboard or a shortcut icon located on the window being displayed to the user. In this scenario, the user can simply select the employed shortcut, which may cause the morphing of the window controls. Again, as discussed above this morphing function may affect the graphical and functional aspects of the window control.

A bubble figure may also appear after or contemporaneous with the held-click. For instance, example 500 of FIG. 5 illustrates the appearance of bubble figure 550 around the selected window control after the held-click, in this case the selected window control being the maximize control 314. In this regard, the bubble figure 550 may serve as an indicator that the morphing window control function has been initiated. As shown, the bubble figure 550 may be circular and transparent so that the selected window control is still visible, such as the selected maximize control 314 depicted in FIG. 5. However, the bubble figure may be any other shape or color, and may be partially or fully transparent. Alternatively, there may be other indicators used to indicate the initiation of the morphing feature.

Figure 6:
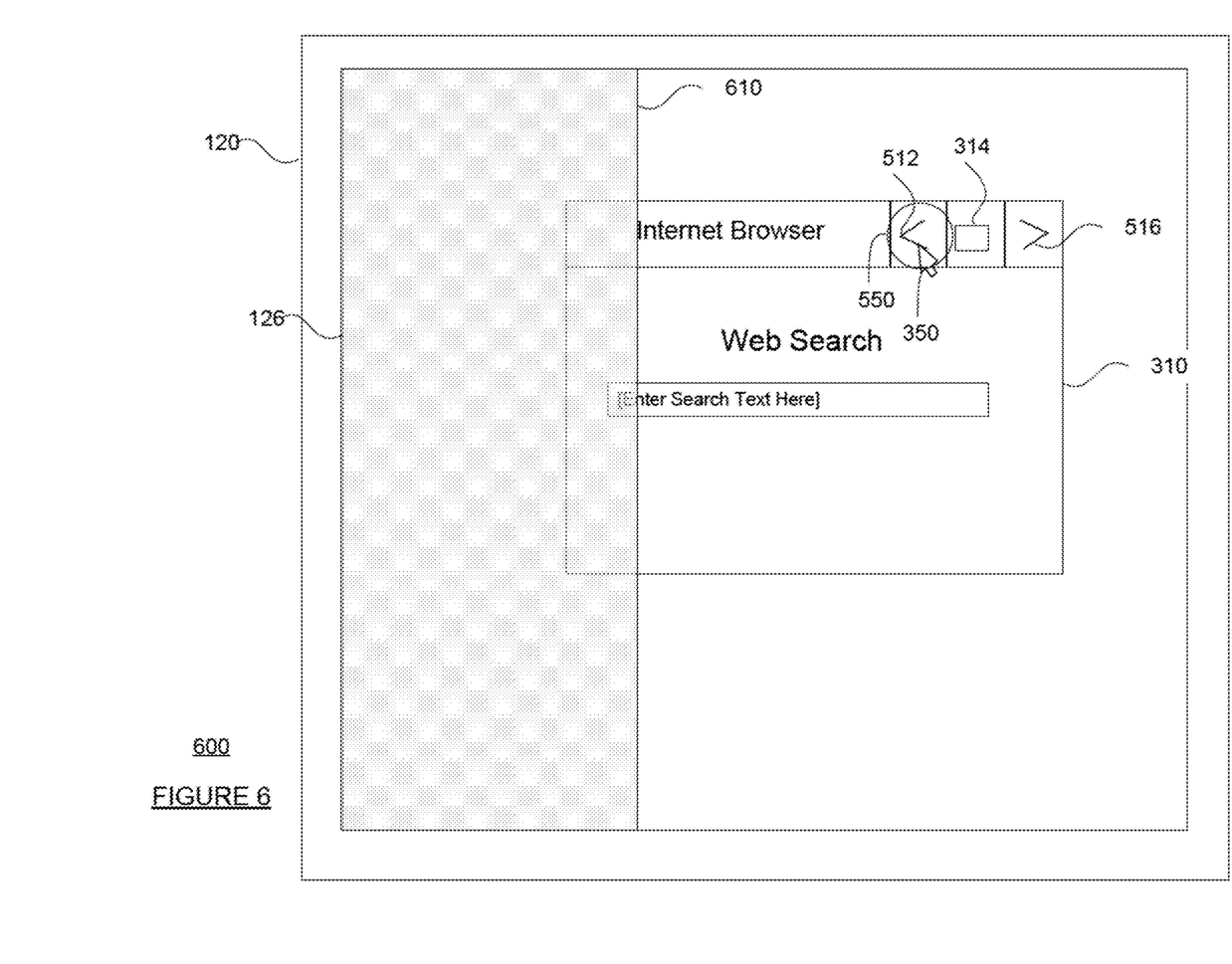
FIG. 6 is an example of a preview window in accordance with aspects of the disclosure.

The user may move the held-clicked cursor over the morphed window controls to preview the functions. By way of example only, example 600 of FIG. 6 illustrates that when the held-click cursor is positioned over the left arrow control 512, a preview window 610 appears. In this example, the preview window 610 is docked on the left side of the display 126 when the cursor is positioned over the left arrow control 512. The preview window 610 demonstrates to the user the positioning of window browser 310 if the user decides to select left arrow control 512. The preview window may not contain all of the information contained in the original window; rather, the preview window may show the shape and location of the window. As shown, the preview window 610 is a transparent window that illustrates the positioning of window browser 310 if the user chooses to select left arrow control 512. No other information need be contained in preview window 610. The preview window 610 may have any other shape or color, and may be partially or fully transparent.

The bubble figure may move to the window control that the cursor is positioned over. For instance, example 600 of FIG. 6 illustrates bubble figure 550 surrounding the left arrow control 512 now that the cursor 350 is positioned over left arrow control 512. In this regard, the bubble figure 550 serves as an indicator as to which window control the cursor 350 is positioned over. As another example, the bubble figure 550 may be displayed over any window control the cursor 350 is positioned over.

Figure 7:
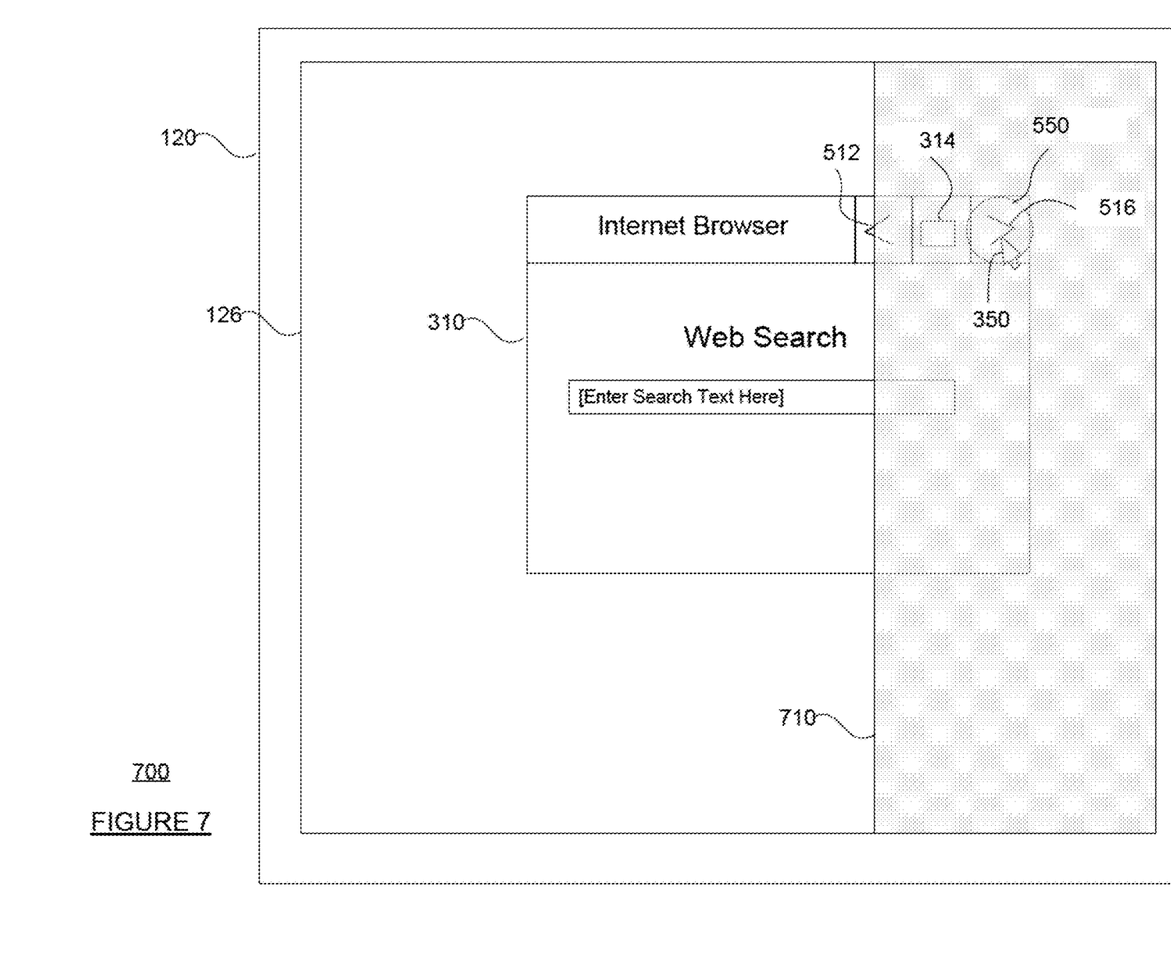
FIG. 7 is an example of another preview window in accordance with aspects of the disclosure.

In another example, the user may position the cursor 350 over right arrow control 516 to view a preview window. In this instance, as shown in example 700 of FIG. 7, the preview window 710 is docked on the right side of display 126. Similar to preview window 610 discussed above, preview window 710 demonstrates to the user the shape and position of the browser window 310, should the user decide to select right arrow control 516. In addition, the bubble figure 550 serves as an indicator that the cursor 350 is positioned over right arrow control 516, as shown in FIG. 7. As with preview window 610, the preview window 710 may have any other shape or color, and may be partially or fully transparent.

After previewing the window, the user may select the particular window control. As one example of selecting the desired window control, the user may release the held-click over the desired control. For example, referring back to FIGS. 6 and 7, the displayed preview windows 610 and 710 may be displayed as a result of the user holding the click while positioning the cursor over the left arrow control 512 or the right arrow control 516. In order to execute the functions associated with the left and right arrow controls 512 and 516, respectively, the user may release the held-click while the cursor is positioned over the desired window control. If a touch-screen display is being used, then the user may execute the desired function by removing his or her finger (or stylus) from the touch-screen display while positioned over the desired window control.

As an alternative to execute the function associated with a particular window control, the user may swiftly move the held click cursor in the direction of the desired window control. For example, instead of the user releasing the held-click over left arrow control 512, the user may quickly move or fling the held click cursor in the direction of the left arrow control 512. In addition, the user may not have to release the held-click directly over left arrow control 512; rather, the user may release the held-click in the general area of the left arrow control 512. In this regard, the execution of the function associated with the left arrow control 512 may be more of a fluid motion. As another example, the user may activate the right arrow control 516 in the same manner (e.g., by moving or flinging the held-click cursor in the direction of the right arrow control and then releasing the held-click).

As an indication that the user selected a particular window control, the bubble figure may "burst." In one example of bursting, the bubble figure may grow slightly larger before it explodes in a bubble-type fashion. For example, the bubble figure may grow by a predetermined amount, such as between 5% to 15%, or on the order of 10%. As another example, the bubble figure may enlarge by at least 5%, or more than 25%. The growth amount may also be relative to the window environment. Alternatively, the size increase need only be enough so that the user is capable of perceiving a change to the bubble figure. After the bubble explodes, the bubble figure may no longer appear on the window controls. However, in future scenarios where the user initiates the morphing function again, such as by holding a click on a particular window control, the bubble figure may re-appear and function similarly as previously discussed.

Figure 8:
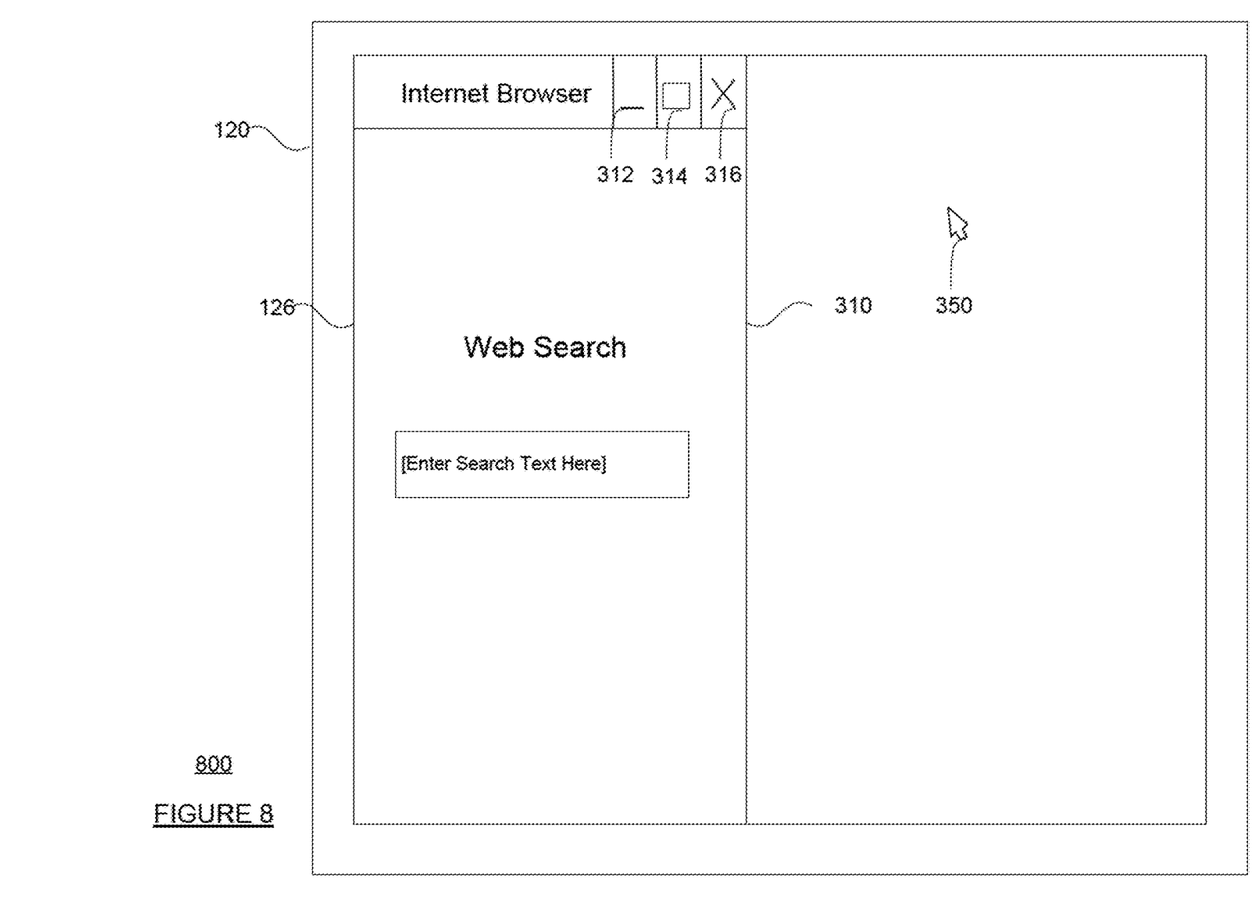
FIG. 8 is an example of a docked window in accordance with aspects of the disclosure.
Figure 9:
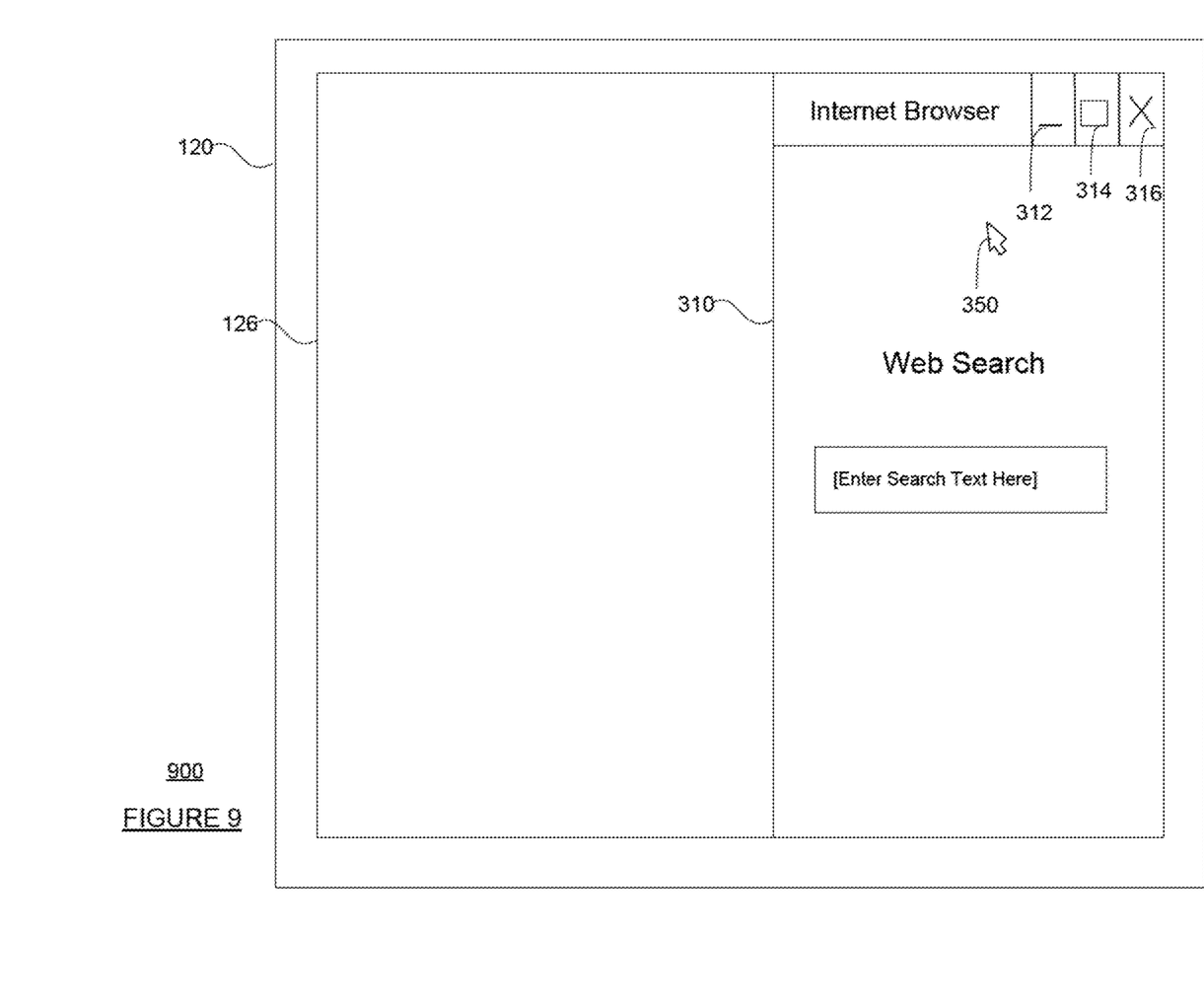
FIG. 9 is an example of another docked window in accordance with aspects of the disclosure.

After the user selects the desired window control, the function associated with the selected control is performed. FIG. 8 illustrates an example 800 of window 310 being docked on the left side of display 126. The window 310 is docked in response to the user selecting the left arrow control 512, as portrayed in FIG. 6. In another example, FIG. 9 illustrates an example 900 of window 310 being docked on the right side of display 126. In this example, the window 310 is docked in response to the user selecting the right arrow control 516, as portrayed in FIG. 7.

After the function associated with the window control is performed, the morphed window controls revert back to their original window controls. For example, as shown in FIG. 8 the left arrow window control 512 reverts back to minimize control 312 and right arrow control 516 reverts back to close control 316. The change of these window controls may be viewed by comparing FIGS. 6 and 8. The reversion back to the original window controls occurs both graphically and functionally. That is, the original window control graphics are restored along with their original functionality.

Figure 10:
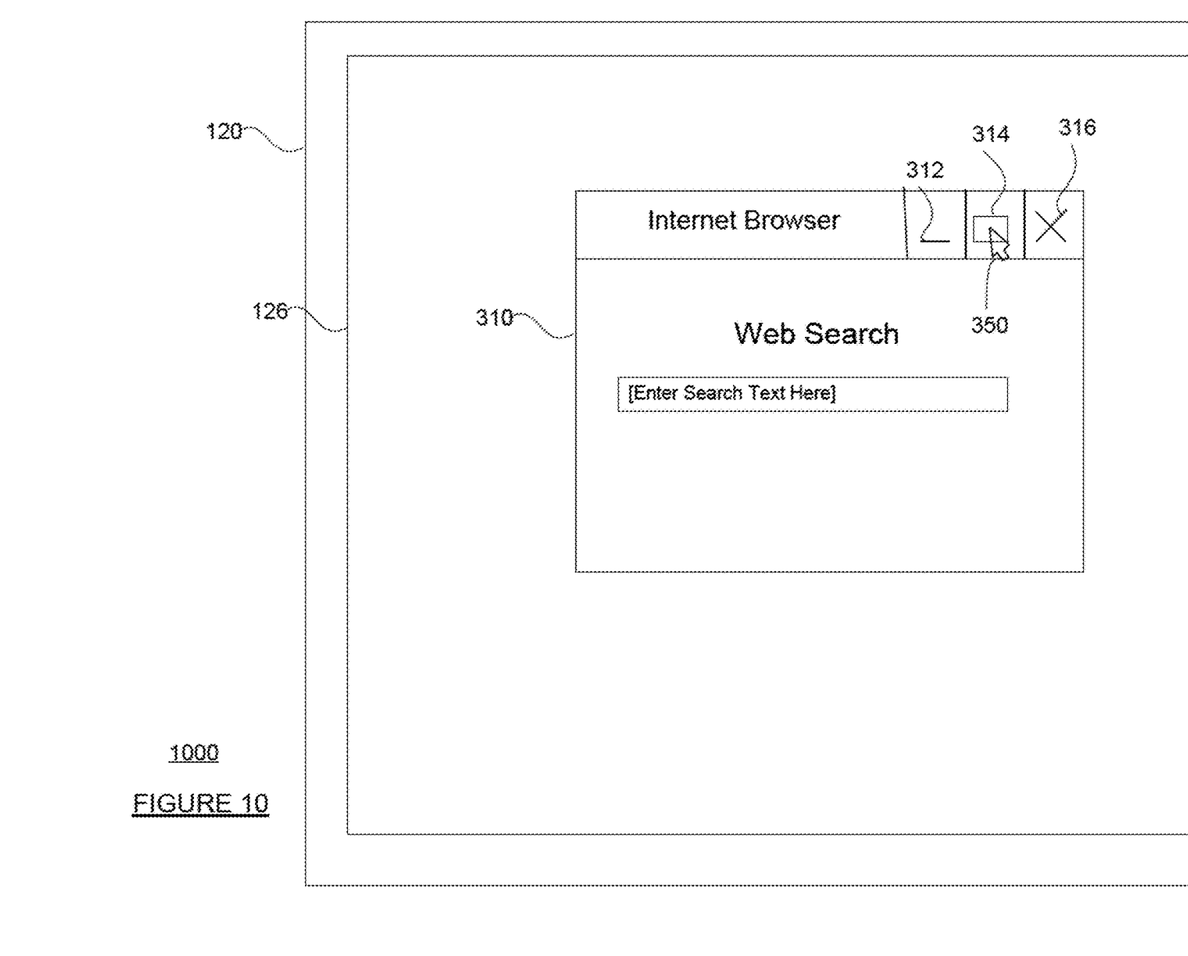
FIG. 10 is an example diagram of canceling the docking feature in accordance with aspects of the disclosure.

As an alternative to docking the window, the user may wish to cancel the window control function. In this regard, the user may cancel the function by selecting the window control that initiated it. For example, in this case the user initiated the function by holding a click over maximize control 314, as illustrated in FIG. 5. Accordingly, the user may simply release a click over the maximize control 314 to cancel the function. FIG. 10 is an example 1000 of the user releasing the click (e.g. selecting) (not shown) on maximize control 314, thereby cancelling the function. Alternatively, the user may cancel the function by releasing the click anywhere on the display except the left and right arrow controls 512 and 516.

Once the function has been cancelled, the window controls may revert back to their original window controls. FIG. 10 illustrates the reversion back to the original window controls from the morphed window controls. Specifically, left arrow control 512 reverts back to minimize control 312 and right arrow control 516 reverts back to close control 316. This reversion restored the original window controls both graphically and functionally.

Figure 11:
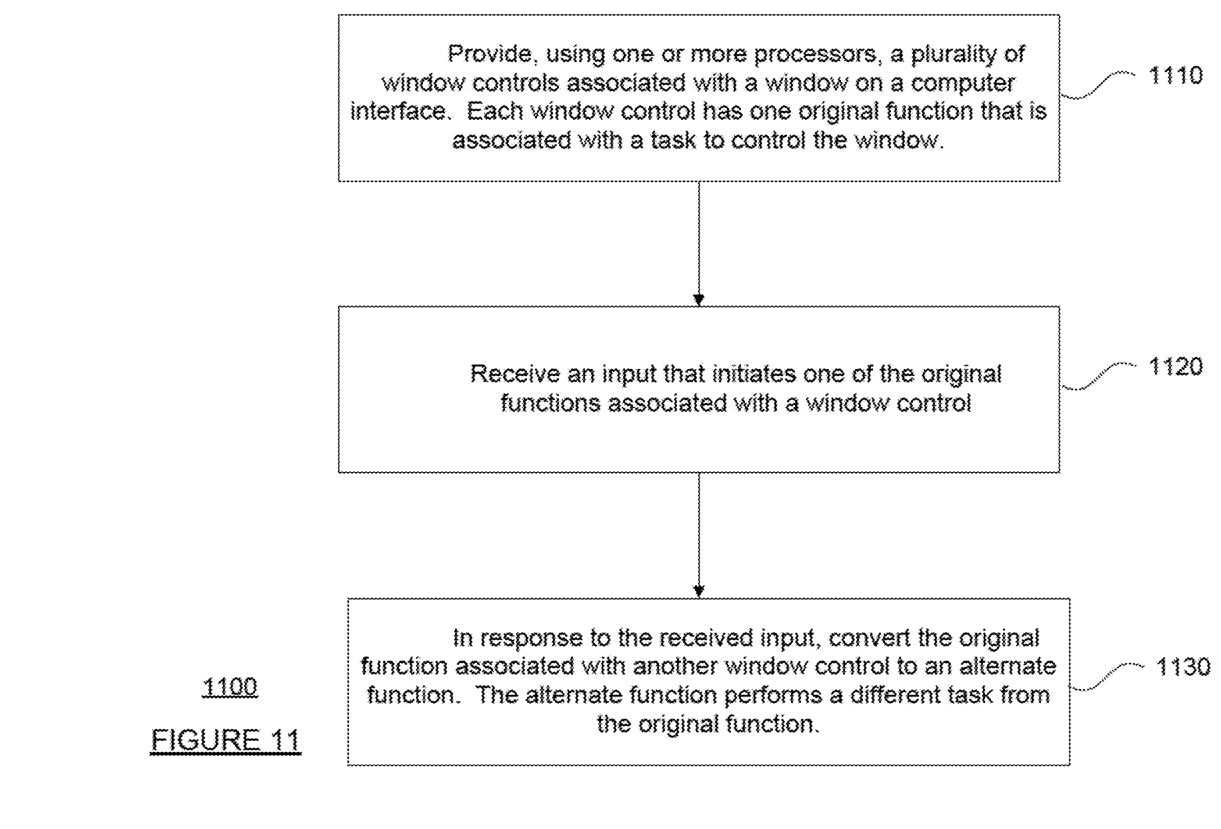
FIG. 11 is an example flow diagram in accordance with aspects of the disclosure.

FIG. 11 is an example flow diagram 1100 of certain features described above, which may be performed by one or more computing devices, e.g., processors as described above. In this example, a computing device provides a plurality of window controls associated with a window of a computer interface at block 1110. Each window control from the plurality of window controls has an original function that is associated with a task to control the window. The computing device may then receive an input at block 1120. The input initiates one of the original functions associated with a first window control from the plurality of window controls. In response to the received input, the computing device converts the original function associated with a non-initiated window control of the plurality of window controls to an alternate function at block 1130. The alternate function of which performs a different task from the original function.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method to morph window controls, comprising:
providing, using one or more processors, a plurality of window controls associated with a window of a computer interface, each window control of the plurality of window controls being configured to perform an original function and an alternate function, the original function being different than the alternate function, the original function and the alternate function controlling the window, each window control having an original-graphic corresponding to the original function and an alternate graphic corresponding to the alternate function;
providing a morphing initiating control being configured to activate a morphing function;
receiving a first input associated with the morphing initiating control; and
in response to the received first input, morphing, by the one or more processors, the original function associated with a non-initiated one of the plurality of window controls to the alternate function while morphing the original graphic into the alternate graphic, wherein the non-initiated window control is different from the morphing initiating control.

2. The method of claim 1, wherein morphing the original graphic to the alternate graphic includes implementing an animation depicting the original graphic changing into the alternate graphic.

3. The method of claim 1, further comprising:
receiving an indication that an indicator is positioned at the non-initiated window control, the indicator identifying a point of focus on the computer interface; and
displaying, in response to the received indication, a preview of the alternate function associated with the non-initiated window control.

4. The method of claim 3, wherein the preview includes showing a docking of the window, wherein the docking of the window positions the window so that an edge of the window touches an edge of the computer interface.

5. The method of claim 1, further comprising:
receiving a second input; and
in response to the received second input,
initiating the alternate function associated with the non-initiated window control, wherein the alternate function positions the window in a different location on the computer interface.

6. The method of claim 5, wherein positioning the window includes docking the window so that an edge of the window touches an edge of the computer interface.

7. The method of claim 1, further comprising:
receiving a cancelling input; and
based on the cancelling input, reverting the alternate function associated with the non-initiated window control back to the original function, and reverting the alternate graphic back to the original graphic.

8. The method of claim 1, wherein the first input is received from at least one of a mouse, a keyboard, or a touch-screen display.

9. The method of claim 1, further comprising:
receiving an indication that an indicator is positioned adjacent the non-initiated window control, the indicator identifying a point of focus on the computer interface; and
based on the indication, displaying a symbol that identifies the non-initiated window control.

10. The method of claim 9, further comprising:
receiving a second input; and
in response to the received second input:
initiating the alternate function associated with the non-initiated window control, and
performing an animation with the symbol that signifies the non-initiated control has initiated its alternate function.

11. The method of claim 10, wherein the animation includes bursting a shape, wherein the shape is the symbol that identifies the non-initiated window control, wherein bursting the shape includes increasing the shape's size by a predetermined amount followed by exploding the shape.

12. The method of claim 11, wherein the non-initiated window control has the same size, shape, and position with respect to the window after the morphing as before the morphing.

13. The method of claim 1, wherein the original function includes resizing the window, and wherein the alternate function includes changing a location of the window.

14. The method of claim 13, wherein resizing the window includes minimizing or maximizing the window, and wherein changing the location of the window includes docking the window to a left or right portion of a display.

15. A system to morph window controls, the system comprising one or more processors configured to:
provide a plurality of window controls associated with a window of a computer interface, each window control of the plurality of window controls being configured to perform an original function and an alternate function, the original function being different than the alternate function, the original function and the alternate function controlling the window, each window control having an original graphic corresponding to the original function and an alternate graphic corresponding to the alternate function;
provide a morphing initiating control being configured to activate a morphing function;
receive a first input associated with the morphing initiating control; and
in response to the received first input, morph the original function associated with a non-initiated one of the window controls to the alternate function while morphine the original graphic associated with non-initiated one of the plurality of window controls to the alternate graphic, wherein the non-initiated window control is different from the morphing initiating control.

16. The system of claim 15, wherein morphing of the original graphic to the alternate graphic includes implementing an animation depicting the original graphic associated with the non-initiated window control changing into the alternate graphic.

17. The system of claim 15, wherein the one or more processors are further configured to:
receive an indication that an indicator is positioned at the non-initiated window control, the indicator identifying a point of focus on the computer interface; and
display, in response to the received indication, a preview of the alternate function associated with the non-initiated window control.

18. The system of claim 17, wherein the preview includes showing a docking of the window, wherein the docking of the window positions the window so that an edge of the window is disposed along an edge of the computer interface.

19. The system of claim 15, wherein the one or more processors are further configured to:
receive a second input; and
in response to the received second input:
initiate the alternate function associated with the non-initiated window control, and
position the window in a different location on the computer interface.

20. The system of claim 15, wherein the one or more processors are further configured to receive a cancelling input, and, in response to the cancelling input, the one or more processors cause the alternate function associated with the non-initiated window control to revert back to the original function.

21. The system of claim 15, wherein the first input is received from at least one of a mouse, a keyboard, or a touch-screen display.

22. The system of claim 15, wherein the one or more processors are further configured to:
receive an indication that an indicator is positioned within a predetermined area of the non-initiated window control, the indicator identifying a point of focus on the computer interface; and
based on the indication, display a symbol that identifies the non-initiated window control.

23. The system of claim 22, wherein the one or more processors are further configured to:
receive a second input; and
in response to the received second input, the one or more processors:
initiate an alternate function associated with the non-initiated window control, and
perform an animation with the symbol that signifies the non-initiated control has initiated the alternate function.

24. The system of claim 23, wherein the animation includes bursting a shape, wherein the shape is the symbol that identifies the non-initiated window control, wherein bursting the shape includes increasing the shape's size by a predetermined amount followed by exploding the shape.

25. The system of claim 15, wherein the original function includes minimizing or maximizing the window, and wherein the alternate function includes docking the window to a left or right portion of a display.

26. A tangible, non-transitory computer-readable storage medium, comprising instructions that, when executed by one or more processors, cause the one or more processors to perform a method comprising:
providing a plurality of window controls associated with a window of a computer interface, each window control of the plurality of window controls being configured to perform an original function and an alternate function, the original function being different than the alternate function, the original function and the alternate function controlling the window, each window control having an original graphic corresponding to the original function and an alternate graphic corresponding to the alternate function;
providing a morphing initiating control being configured to activate a morphing function;
receiving a first input associated with the morphing initiating control; and
in response to the received first input, converting, by the one or more processors, the original function associated with a non-initiated one of the plurality of window controls to the alternate function while morphing the original graphic into the alternate graphic, wherein the non-initiated window control is different from the morphing initiating control.

* * * * *